United States Patent
Tsuchiya

(10) Patent No.: US 12,269,357 B2
(45) Date of Patent: Apr. 8, 2025

(54) CHARGING FACILITY AND MANAGEMENT DEVICE THEREOF

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 509 days.

(21) Appl. No.: 17/680,290

(22) Filed: Feb. 25, 2022

(65) Prior Publication Data

US 2022/0281332 A1   Sep. 8, 2022

(30) Foreign Application Priority Data

Mar. 3, 2021   (JP) ................... 2021-033300

(51) Int. Cl.
| | | |
|---|---|---|
| *B60L 53/16* | (2019.01) | |
| *B60L 53/20* | (2019.01) | |
| *B60L 53/65* | (2019.01) | |
| *B60L 53/66* | (2019.01) | |

(52) U.S. Cl.
CPC .............. *B60L 53/16* (2019.02); *B60L 53/20* (2019.02); *B60L 53/65* (2019.02); *B60L 53/66* (2019.02)

(58) Field of Classification Search
CPC ................................ B60L 53/16; B60L 53/20
USPC ....................................................... 320/109
See application file for complete search history.

(56) References Cited

U.S. PATENT DOCUMENTS

| | | | | |
|---|---|---|---|---|
| 8,890,475 | B1* | 11/2014 | Becker | B60L 53/66 |
| | | | | 320/109 |
| 2019/0210468 | A1* | 7/2019 | Wittl | H02J 7/00714 |
| 2021/0053456 | A1 | 2/2021 | Freeling-Wilkinson | |
| 2021/0252989 | A1* | 8/2021 | Price | B60L 53/31 |
| 2022/0024338 | A1* | 1/2022 | Zhou | B60L 58/12 |

FOREIGN PATENT DOCUMENTS

| | | |
|---|---|---|
| CN | 108215892 A | 6/2018 |
| CN | 112334358 A | 2/2021 |
| JP | 2011109807 A | 6/2011 |
| WO | 2019/073271 A1 | 4/2019 |

\* cited by examiner

*Primary Examiner* — Jack Chiang
*Assistant Examiner* — Suchin Parihar
(74) *Attorney, Agent, or Firm* — HAUPTMAN HAM, LLP

(57) ABSTRACT

A charging facility includes a movable unit, an ascending and descending device, and a control device that includes a communication device. The movable unit includes a connection device. The ascending and descending device causes the movable unit to ascend and descend between a first state where the movable unit is housed underground and a second state where the movable unit is exposed above the ground and a power storage device mounted on a vehicle is connectable to the connection device. The control device acquires a position of a target vehicle and a remaining capacity of the power storage device and controls, when the remaining capacity is lower than a threshold value and the position is within a first distance from the charging facility, the ascending and descending device such that the movable unit ascends.

4 Claims, 9 Drawing Sheets

CHARGING FACILITY AND MANAGEMENT DEVICE THEREOF

CROSS-REFERENCE TO RELATED APPLICATION

This application claims priority to Japanese Patent Application No. 2021-033300 filed on Mar. 3, 2021, incorporated herein by reference in its entirety.

BACKGROUND

1. Technical Field

The present disclosure relates to a charging facility and a management device of a charging device.

2. Description of Related Art

A charging facility that charges a power storage device mounted on a vehicle and the like is installed in a parking lot or a sidewalk outside the vehicle and the like, but the charging facility occupies space for installation and thus it may hinder walking, or traveling of the vehicle. For this reason, a technology for making the charging facility to be movable and, for example, for causing the charging facility to be housed underground is known.

For example, Japanese Unexamined Patent Application Publication No. 2011-109807 discloses a charging pole installed to be ascendable and descendible so that it can be stood up from the ground and housed underground.

SUMMARY

However, when the movable charging facility ascendable and descendible as described above is in a state where it is housed underground, a user who is driving a vehicle and intending to use the charging facility may not be able to check an exact position of the charging facility to be used. For this reason, for example, when a remaining capacity of a battery mounted on the vehicle is low and the user desires quick charging, it takes time to find the charging facility to be used, switch the charging facility to be in a state where it is stood up from the ground, and use the charging facility, bringing about a probability that the convenience of using the charging facility may be impaired.

The present disclosure provides a charging facility and a management device thereof that makes it possible to easily find and quickly use the charging facility to be used.

A charging facility according to a first aspect of the present disclosure is installed on a bottom surface of a recess portion provided in the ground and configured to charge a power storage device mounted on a vehicle. The charging facility includes a movable unit, an ascending and descending device, and a control device. The movable unit includes a connection device configured to be connected to the power storage device. The ascending and descending device is configured to cause the movable unit to ascend and descend between a first state where the movable unit is housed under the ground and a second state where the movable unit is exposed above the ground and the power storage device is connectable to the connection device. The control device includes a communication device that is configured to communicate with a device external to the charging facility. The control device is configured to control the ascending and descending device using information received via the communication device, acquire a position of a target vehicle to be charged and a remaining capacity of the power storage device using the communication device, and control, when the remaining capacity is lower than a threshold value and the acquired position is within a first distance from the charging facility, the ascending and descending device such that the movable unit ascends.

As such, when the remaining capacity is lower than the threshold value and the position of the target vehicle is within the first distance from the charging facility, the movable unit ascends, and thus it is possible for the user to easily find the charging facility to be used and start charging earlier than when the movable unit is ascended after the vehicle reaches the charging facility to be used.

In the first aspect, the first distance may be a distance at which the charging facility is visually recognizable from the target vehicle and the movable unit is switchable to the second state by a time at which the target vehicle arrives at the charging facility.

As such, it is possible for the user to easily find the charging facility to be used and start charging earlier than when the movable unit is ascended after the vehicle reaches the charging facility to be used.

In the first aspect, when the remaining capacity is higher than the threshold value and the acquired position is within a second distance from the charging facility, the control device may control the ascending and descending device such that the movable unit ascends. The second distance may be shorter than the first distance.

As such, it is possible for the user to easily find the charging facility to be used while restricting a period in which the movable unit is in the second state from becoming unnecessarily long, and start charging earlier than when the movable unit is ascended after the vehicle reaches the charging facility to be used.

A management device of a charging facility according to a second aspect of the present disclosure manages operations of a plurality of charging facilities installed on a bottom surface of a recess portion provided in the ground and configured to charge a power storage device mounted on a vehicle. A charging facility includes a movable unit, an ascending and descending device, and a control device. The movable unit includes a connection device configured to be connected to the power storage device. The ascending and descending device is configured to cause the movable unit to ascend and descend between a first state where the movable unit is housed under the ground and a second state where the movable unit is exposed above the ground and the power storage device is connectable to the connection device. The control device includes a communication device that is configured to communicate with the management device. The control device is configured to control the ascending and descending device using information received via the communication device. The management device includes a processor configured to acquire a position of a target vehicle to be charged by any one target charging facility of the plurality of charging facilities and a remaining capacity of the power storage device mounted on the target vehicle, and request, when the remaining capacity of the target vehicle is lower than a threshold value and the position of the target vehicle is within a first distance from the target charging facility, the target charging facility to ascend the movable unit.

As such, when the remaining capacity is lower than the threshold value and the position of the target vehicle is within the first distance from the target charging facility, the movable unit ascends, and thus it is possible for the user to easily find the target charging facility and start charging earlier than when the movable unit is ascended after the vehicle reaches the target charging facility.

In the second aspect, the first distance may be a distance at which the target charging facility is visually recognizable from the target vehicle and the movable unit is switchable to the second state by a time at which the target vehicle arrives at the target charging facility.

As such, it is possible for the user to easily find the target charging facility to be used and start charging earlier than when the movable unit is ascended after the vehicle reaches the target charging facility.

In the second aspect, when the remaining capacity is higher than the threshold value and the acquired position is within a second distance from the target charging facility, the processor may request the target charging facility to ascend the movable unit. The second distance may be shorter than the first distance.

As such, it is possible for the user to easily find the target charging facility while restricting a period in which the movable unit is in the second state from becoming unnecessarily long, and start charging earlier than when the movable unit is ascended after the vehicle reaches the target charging facility.

With each aspect of the present disclosure, it is possible to provide a charging facility and a management device thereof that makes it possible to easily find and quickly use the charging facility to be used.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
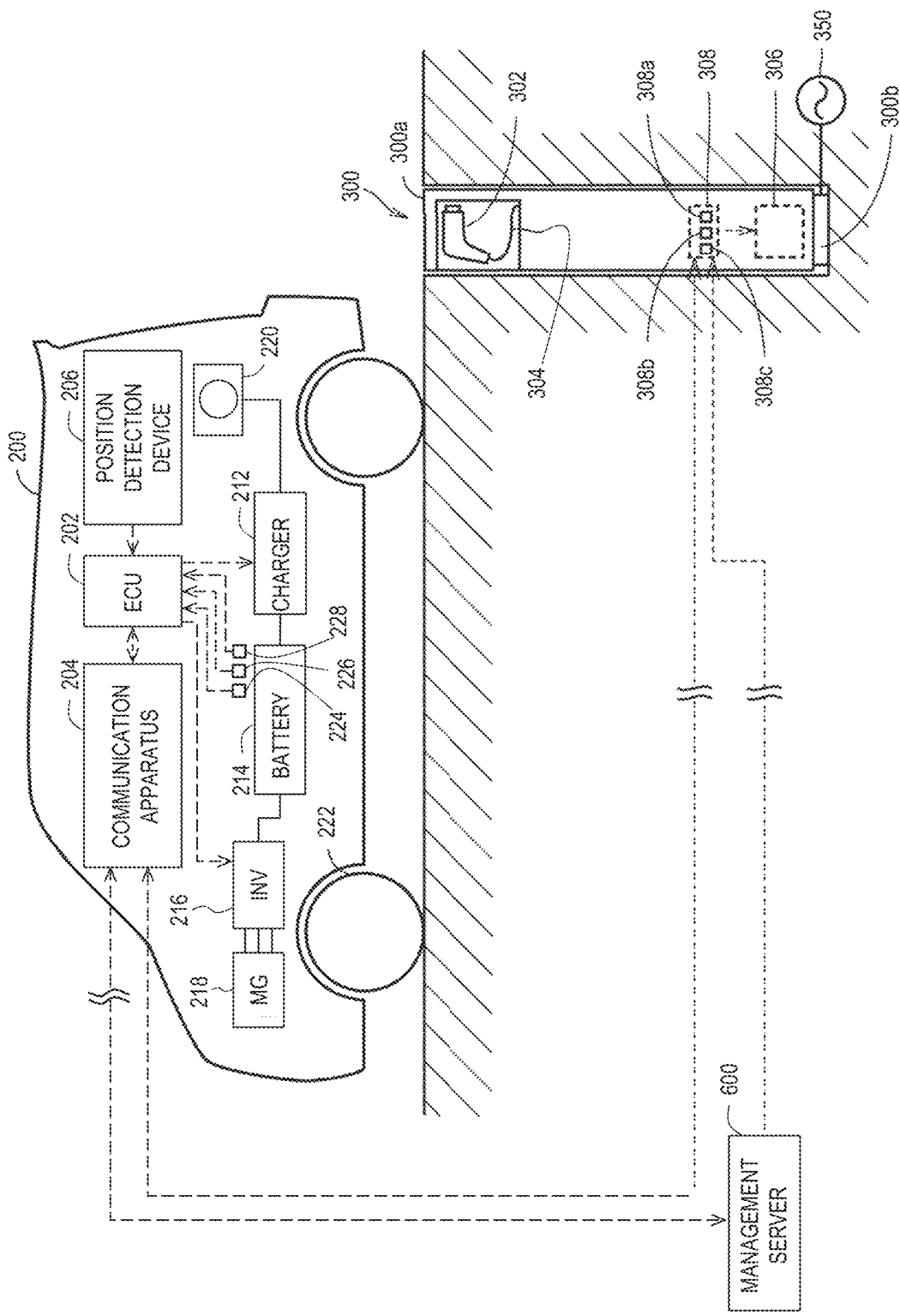
FIG. 1 is a diagram illustrating an example of a configuration of an electrically driven vehicle and a charging stand in a state where a movable unit is housed underground.

Hereinafter, embodiments of the present disclosure will be described in detail with reference to the drawings. The same or corresponding parts in the drawings are designated by the same reference signs, and the description thereof will not be repeated.

Figure 2:
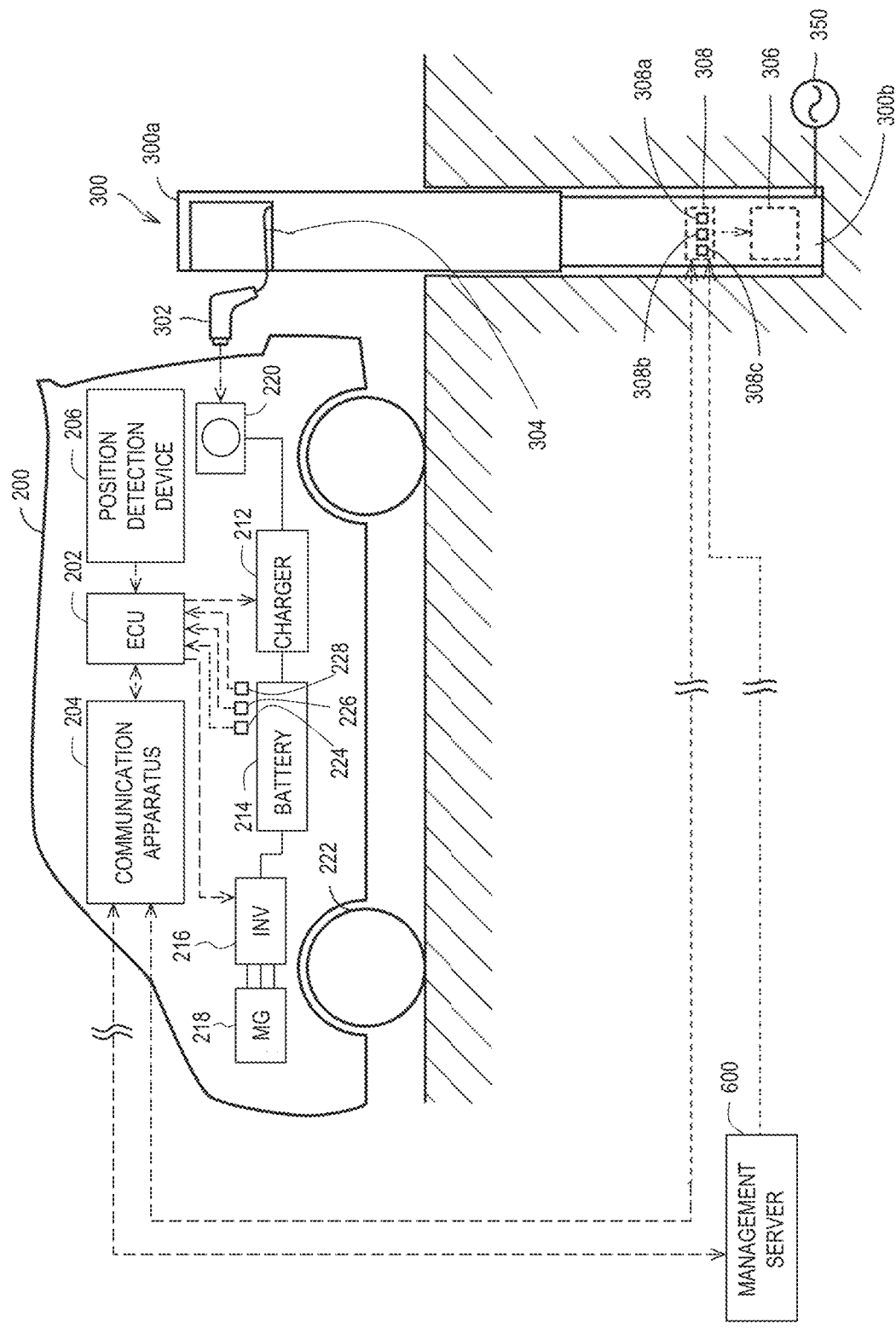
FIG. 2 is a diagram illustrating an example of a configuration of the electrically driven vehicle and the charging stand in a state where the movable unit is exposed above the ground.

Hereinafter, a configuration of a charging stand 300, which is a charging facility according to an embodiment of the present disclosure, will be described as an example. FIG. 1 is a diagram illustrating an example of a configuration of an electrically driven vehicle 200 and the charging stand 300 in a state where a movable unit 300*a* (described below) is housed underground. FIG. 2 is a diagram illustrating an example of a configuration of the electrically driven vehicle 200 and the charging stand 300 in a state where the movable unit 300*a* is exposed above the ground.

As illustrated in FIGS. 1 and 2, an upper end of the charging stand 300 is positioned at substantially the same level as that of the ground, and configured to be ascendable/descendible between a first state where the movable unit 300*a* is housed underground (see FIG. 1) and a second state where the upper end thereof ascends to a predetermined level so that the movable unit 300*a* is exposed above the ground (see FIG. 2).

The charging stand 300 has, for example, a cylindrical housing and is installed on the bottom surface of a recess portion formed in the ground. The recess portion is formed in the ground so as to have a predetermined gap from an outer circumferential surface of the housing of the charging stand 300 and a depth comparable to the vertical length of the charging stand 300 in the first state.

The charging stand 300 includes a movable unit 300*a* and a fixing unit 300*b*. A housing space that can house a connector 302 is formed on an upper portion of the movable unit 300*a*. One end of a cable 304 is connected to the connector 302, and the other end thereof is connected to a power source 350. The power source 350 may be, for example, an alternating current power source composed of a commercial power source or the like. The cable 304 may have, for example, an extendable unit having a curled unit or an extendable unit having a winding structure, and is configured to extend up to an inlet 220 of the electrically driven vehicle 200 parked in a parking space when the connector 302 is taken out.

The fixing unit 300*b* is fixed to the bottom surface of the recess portion formed in the ground. The fixing unit 300*b* may be fixed to any part in the recess portion formed in the ground, and is not particularly limited to being fixed to the bottom surface of the recess portion.

The fixing unit 300*b* includes an ascending and descending device 306 that ascends/descends the movable unit 300*a* in the up-down direction, and a control device 308 that controls an operation of the ascending and descending device 306.

The ascending and descending device 306 includes an actuator that causes the movable unit 300*a* to ascend/descend. The ascending and descending device 306 may have, for example, a rack-pinion type mechanism that causes the movable unit 300*a* to ascend/descend by rotating a pinion gear which meshes with a rack gear fixed to the movable unit 300*a* using an electric actuator, or a mechanism that causes the movable unit 300*a* to ascend/descend by fixing a rod connected to a piston to the movable unit 300*a* and increasing/decreasing a hydraulic pressure supplied to a cylinder body fixed to the fixing unit 300*b* using a hydraulic cylinder. Alternatively, it may have a mechanism that causes the movable unit 300*a* to ascend/descend by generating a repulsive force due to a magnetic force between the movable unit 300*a* and the fixing unit 300*b*.

The ascending and descending device 306 is configured to prevent, using, for example, a stopper mechanism, the movable unit 300*a* from descending below a level corresponding to the first state and from ascending beyond a level corresponding to the second state.

The control device 308 includes a central processing unit (CPU) 308a, a memory 308b composed of a read-only memory (ROM), a random access memory (RAM), or the like, and a communication device 308c communicable with an external device. The control device 308 controls an electric device (for example, an ascending and descending device 306) provided in the charging stand 300 based on information stored in the memory 308b, information received via the communication device 308c, or other information acquired from sensors (not shown). These controls are not limited to having a configuration in which processing by the software is executed by the CPU 300a, and may have a configuration constructed by dedicated hardware (an electronic circuit).

The communication device 308c is configured to be able to communicate various pieces of information and the like with a device external to the charging stand 300. FIGS. 1 and 2 illustrate an example where the communication apparatus 204, the communication device 308c, and a management server 600 can communicate with each other.

The communication device 308c may be configured to be communicable with the management server 600 via, for example, wired communication. Further, the communication device 308c may be configured to be communicable with the communication apparatus 204 and the management server 600 via, for example, wireless communication.

When, for example, an execution condition for an ascending control is satisfied, the control device 308 executes the ascending control to the ascending and descending device 306 such that the charging stand 300 is switched from the first state to the second state. The execution condition for the ascending control includes, for example, a condition in which the charging stand 300 is in the first state and a condition in which there is an execution request for the ascending control (hereinafter, sometimes referred to as an ascending request) in the charging stand 300. The control device 308 may receive information indicating the ascending request from, for example, a mobile terminal (not shown) owned by a user who executes charging at the charging stand 300, and determine whether there is an ascending request based on information from an external device.

Alternatively, when, for example, an execution condition for a descending control is satisfied, the control device 308 executes the descending control to the ascending and descending device 306 such that the charging stand 300 is switched from the second state to the first state. The execution condition for the descending control includes, for example, a condition in which the charging stand 300 is in the second state and a condition in which there is the execution request for the descending control (hereinafter, referred to as a descending request) in the charging stand 300. The control device 308 may receive information indicating the descending request from, for example, a mobile terminal and determine whether there is the descending request based on information from an external device.

The management server 600 includes a control device, a communication device, and a storage device (none of which are shown). The control device (processor) of the management server 600 is composed of a CPU, a memory, and the like. The communication device of the management server 600 is configured to be communicable with the charging stand 300 or other devices, such as a mobile terminal, via a communication network or directly. Predetermined information is stored in the storage device of the management server 600. The control device of the management server 600 receives the predetermined information from the electrically driven vehicle 200 or the charging stand 300 via the communication device, and stores a part or all of the received information in the storage device.

FIGS. 1 and 2 further illustrate an example of a configuration of the electrically driven vehicle 200 parked in the parking space in which charging is possible using the charging stand 300. As illustrated in FIGS. 1 and 2, examples of the electrically driven vehicle 200 include vehicles having power storage devices mounted thereon, such as a plug-in hybrid vehicle and an electric vehicle. The electrically driven vehicle 200 is configured to be capable of receiving power supply from the charging stand 300, but is not particularly limited to the vehicles exemplified above and may be, for example, a vehicle having a power storage device for external power supply mounted thereon.

The electrically driven vehicle 200 includes an electronic control unit (ECU) 202, a communication apparatus 204, a position detection device 206, a charger 212, a battery 214, an inverter 216, a motor generator 218, and an inlet 220.

The ECU 202 includes a CPU and a memory composed of a ROM, a RAM, or the like. The ECU 202 controls an electric device (for example, the communication apparatus 204, the charger 212, or the inverter 216) provided in the electrically driven vehicle 200 based on the information stored in the memory or the information acquired from the sensors (for example, the position detection device 206, a voltage sensor 224, a current sensor 226, or a temperature sensor 228 described below).

The communication apparatus 204 is configured to be able to communicate various pieces of information and the like with a device external to the electrically driven vehicle 200. The communication apparatus 204 is configured to be communicable with, for example, the management server 600 and the charging stand 300. The communication apparatus 204 may be configured to be communicable with a mobile terminal.

For example, the position detection device 206 acquires a current position of the electrically driven vehicle 200 based on a signal (radio waves) from a Global Positioning System (GPS) satellite, and outputs a signal indicating the current position of the electrically driven vehicle 200 to the ECU 202. As a method of acquiring the current position of the electrically driven vehicle 200, a method of acquiring the current position using a satellite or the like, other than the GPS satellite, capable of detecting the position may be used, or a method of acquiring the current position by exchanging predetermined information with an access point of a mobile base station or a wireless local area network (LAN) may be used.

When alternating current power is supplied from the inlet 220, the charger 212 converts the supplied alternating current power into direct current power and supplies it to the battery 214. The battery 214 is charged by an operation of the charger 212. The charger 212 is controlled by, for example, a control signal from the ECU 202.

The battery 214 may be, for example, a power storage element configured to be rechargeable, and may be typically a secondary battery, such as a nickel metal hydride battery or a lithium-ion battery containing a liquid or solid electrolyte. Alternatively, the battery 214 may be a power storage device that can store power, and, instead of the battery 214, for example, a large-capacity capacitor may be used.

The inverter 216 converts, for example, the direct current power of the battery 214 into alternating current power and supplies it to the motor generator 218. Further, the inverter 216 converts, for example, alternating current power (regenerative power) from the motor generator 218 into direct current power and supplies it to the battery 214 so as to charge the battery 214.

The motor generator 218 receives power supplied from the inverter 216 to apply a rotational force to drive wheels 222. The drive wheels 222 rotate by the rotational force applied by the motor generator 218 to cause the electrically driven vehicle 200 to travel.

The inlet 220 is provided on an exterior portion of the electrically driven vehicle 200 together with a cover (not shown), such as a lid. The inlet 220 is a power receiving unit that receives charging power supplied from an external charging facility (for example, the charging stand 300). The inlet 220 has a shape that enables the connector 302 of the charging stand 300 to be attached thereto. Both the inlet 220 and the connector 302 have built-in contact points, and when the connector 302 is attached to the inlet 220, the contact points come into contact with each other and the inlet 220 and the connector 302 are electrically connected. At this time, the battery 214 of the electrically driven vehicle 200 is in a state where it can be charged using the power supplied from the charging stand 300.

The voltage sensor 224, the current sensor 226, and the temperature sensor 228 are connected to the ECU 202.

The voltage sensor 224 detects voltage VB of the battery 214 and transmits a signal indicating the detected voltage VB to the ECU 202. The current sensor 226 detects current IB of the battery 214 and transmits a signal indicating the detected current IB to the ECU 202. The temperature sensor 228 detects the temperature TB of the battery 214 and transmits a signal indicating the detected temperature TB to the ECU 202.

The ECU 202 calculates a state of charge (SOC) indicating a remaining capacity of the battery 214 using the detection results of the voltage sensor 224, the current sensor 226, and the temperature sensor 228 while, for example, the electrically driven vehicle 200 is being driven. The SOC is the ratio, represented as a percentage, of a current storage capacity to a storage capacity in the fully charged state of the battery 214. As a SOC calculation method, various well-known methods, such as a method of current value integration (Coulomb counting) or a method of estimating open circuit voltage (OCV), can be employed.

Figure 3:
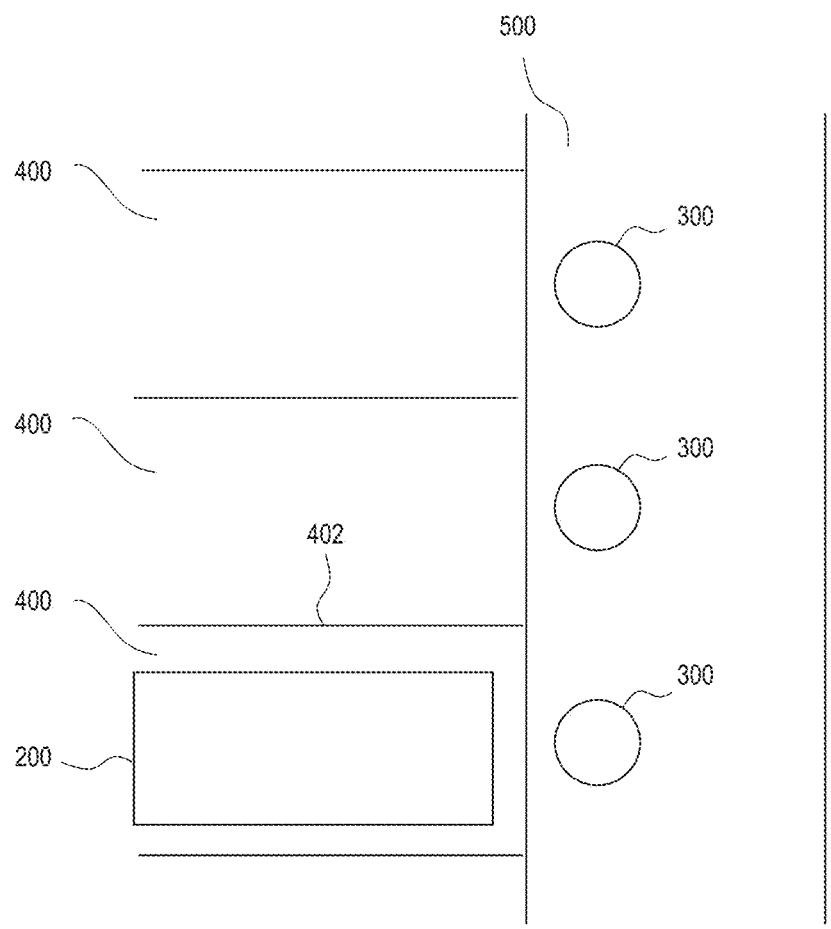
FIG. 3 is a diagram illustrating an example of a layout of charging stands and parking spaces.

The charging stand 300 may be installed on a sidewalk adjacent to a plurality of parking spaces in a parking lot, a sidewalk adjacent to a plurality of parking spaces set on a road, or the like. FIG. 3 is a diagram illustrating an example of a layout of the charging stands 300 and parking spaces 400. As illustrated in FIG. 3, when a plurality of parking spaces 400 is set side by side by partition lines 402 in a parking lot, the charging stands 300 are installed at a position adjacent to respective parking spaces 400. FIG. 3 illustrates an example of a configuration in which a sidewalk 500 is provided at one end of the parking spaces 400 in the longitudinal direction (on the right side of the sheet of FIG. 3). In this case, the charging stands 300 are installed along the sidewalk 500. When the electrically driven vehicle 200 is parked in any of the parking spaces 400 and the charging stand 300 is in the second state, a user takes out the connector 302 from the charging stand 300 and connects it to the inlet 220 of the electrically driven vehicle 200.

Figure 4:
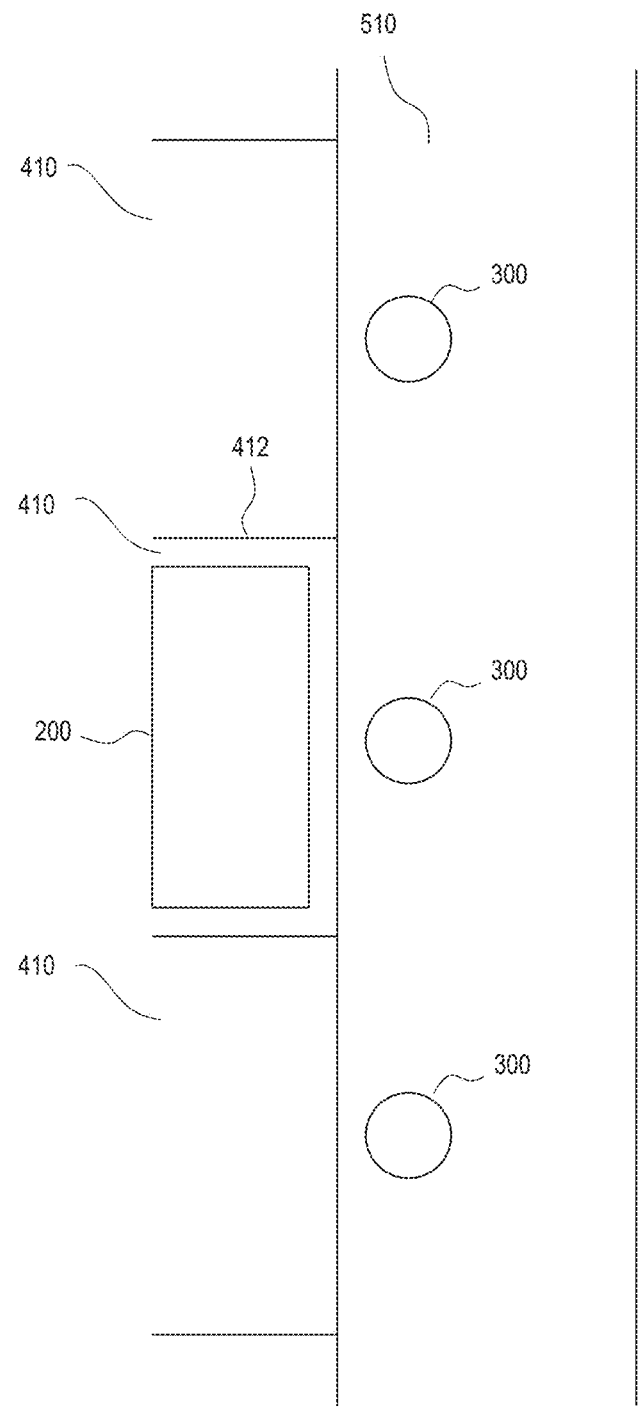
FIG. 4 is a diagram illustrating another example of a layout of the charging stands and parking spaces.

FIG. 4 is a diagram illustrating another example of the layout of the charging stands 300 and parking spaces 410. As illustrated in FIG. 4, even when a plurality of parking spaces 410 is set in the column direction by partition lines 412 along the road, the charging stands 300 are installed at a position adjacent to respective parking spaces 410. FIG. 4 illustrates an example of a configuration in which the parking spaces 410 are set along the sidewalk 510. In this case, the charging stands 300 are installed along the sidewalk 510. When the electrically driven vehicle 200 is parked in any of the parking spaces 410 and the charging stand 300 is in the second state, the user takes out the connector 302 from the closest charging stand 300 and connects it to the inlet 220 of the electrically driven vehicle 200.

When the above-described movable charging stand 300 that is ascendable/descendible is in the first state where it is housed underground, the user who is driving the electrically driven vehicle 200 and intending to use the charging stand 300 may not be able to check an exact position of the charging stand 300 to be used. For this reason, for example, when the remaining capacity of the battery 214 mounted on the electrically driven vehicle 200 is low and the user desires quick charging, it takes time to find the charging stand 300 to be used, switch the charging stand 300 to the second state, and use the charging stand 300, bringing about a probability that the convenience of using the charging stand 300 may be impaired.

Therefore, in the present embodiment, when the SOC of the battery 214 of a target vehicle to be charged is lower than a threshold value and a position of the target vehicle is within a first distance from the charging stand 300, the control device 308 of the charging stand 300 controls the ascending and descending device 306 such that the movable unit 300a of the charging stand 300 ascends.

As such, it is possible for the user to easily find the charging stand 300 to be used and start charging earlier than when the movable unit 300a is ascended after the electrically driven vehicle 200 reaches the charging stand 300 to be used.

Figure 5:
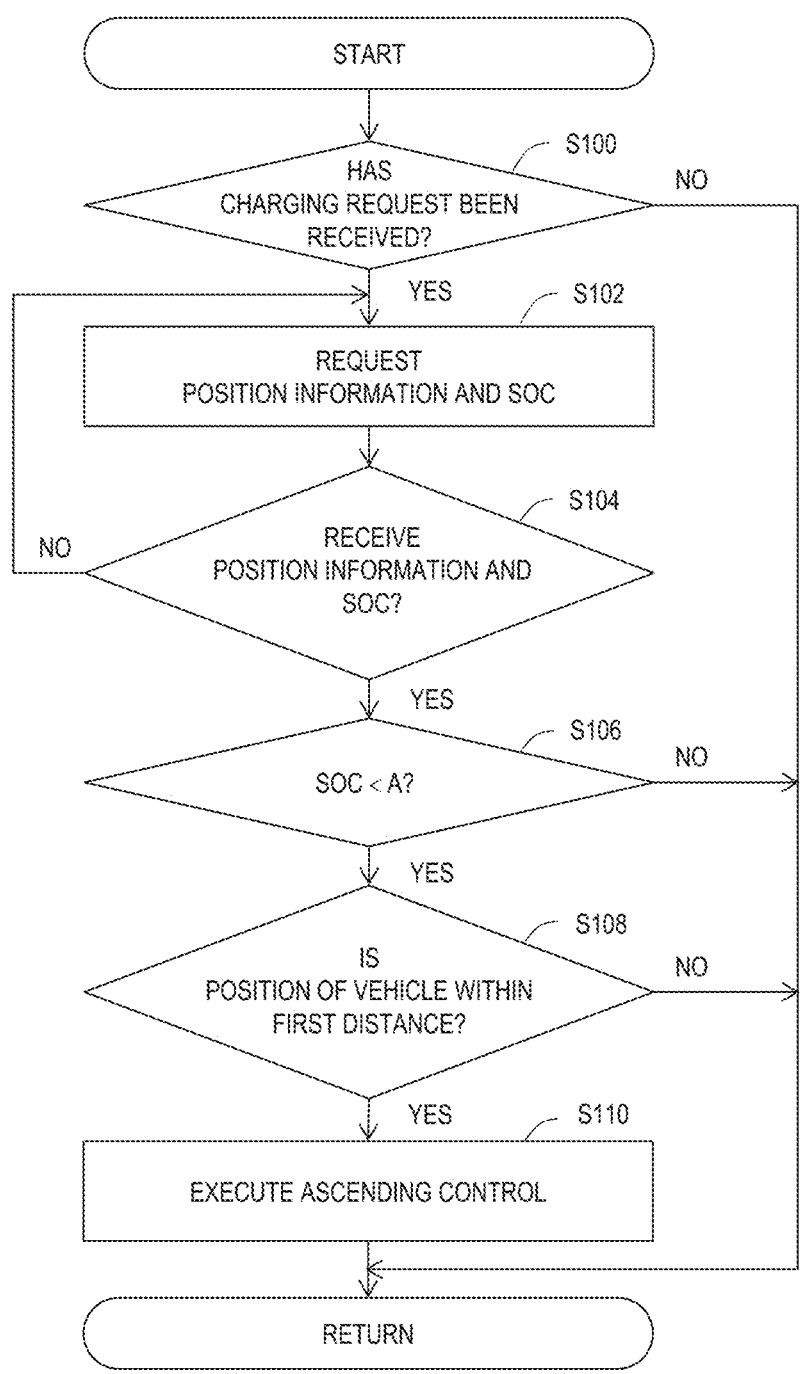
FIG. 5 is a flowchart illustrating an example of processing executed by a control device of the charging stand.

Hereinafter, an example of control processing executed by the control device 308 will be described with reference to FIG. 5. FIG. 5 is a flowchart illustrating an example of processing executed by the control device 308 of the charging stand 300. A series of processes illustrated in this flowchart are repeatedly executed at predetermined control cycles.

At step (hereinafter, step is referred to as S) 100, the control device 308 determines whether it has received a charging request. The control device 308 determines whether it has received the charging request based on, for example, a flag set to an ON state when the charging request is received. When, for example, the flag is in the ON state, the control device 308 determines that it has received the charging request. The charging request indicates a request for charging from the electrically driven vehicle 200 or the management server 600.

When, for example, the user sets a destination, the ECU 202 of the electrically driven vehicle 200 executes an operation of specifying a usable charging stand 300 around the destination. Alternatively, when, for example, the user executes a predetermined operation for searching for a usable charging stand 300, the ECU 202 executes the operation of specifying a usable charging stand 300 around the electrically driven vehicle 200.

The ECU 202 executes the operation of specifying a usable charging stand 300 by, for example, searching for, such as inquiring of the management server 600, a usable charging stand 300 within a predetermined range centered on the destination or the electrically driven vehicle 200. The ECU 202 specifies, from a search result, a usable charging stand 300 closest to the center. The ECU 202 transmits the charging request to the specified charging stand 300 after establishing communication with the specified charging stand 300.

Alternatively, when, for example, the user sets the destination, the ECU 202 transmits position information of the set destination to the management server 600. Alternatively, when, for example, the user executes the operation for searching for a usable charging stand 300, the ECU 202 transmits position information of the electrically driven vehicle 200 to the management server 600.

The management server 600 searches for a usable charging stand 300 within a predetermined range centered on, for example, the destination or the electrically driven vehicle 200. The management server 600 specifies, from the search result, a usable charging stand 300 closest to the center. The management server 600 transmits the charging request to the specified charging stand 300 after establishing communication with the specified charging stand 300.

When the control device 308 determines that it has received the charging request (YES in S100), the process proceeds to S102.

In S102, the control device 308 requests the position information and the SOC of the electrically driven vehicle 200 to be charged. The control device 308 transmits request information for requesting the position information and the SOC of the electrically driven vehicle 200 to, for example, a transmission source (the electrically driven vehicle 200 or the management server 600) of the charging request.

Upon receiving the charging request from, for example, the electrically driven vehicle 200, the control device 308 transmits the request information to the electrically driven vehicle 200, which is the transmission source. Alternatively, upon receiving the charging request from the management server 600, the control device 308 transmits the request information for requesting the position information and the SOC of the electrically driven vehicle 200 to be charged to the transmission source, which is the management server 600. Upon receiving the request information from the charging stand 300, the management server 600 transmits the request information for requesting the position information and the SOC to the electrically driven vehicle 200 to be charged.

Upon receiving the request information, the ECU 202 of the electrically driven vehicle 200 acquires the position information of the electrically driven vehicle 200 using the position detection device 206 and acquires the SOC using the current IB, the voltage VB, and the temperature TB of the battery 214. The ECU 202 transmits the acquired position information and SOC to the charging stand 300. At this time, the position information and the SOC may be transmitted to the charging stand 300 via the management server 600.

In S104, the control device 308 determines whether to receive the position information and the SOC of the electrically driven vehicle 200 to be charged. The control device 308 may receive the position information and the SOC from the electrically driven vehicle 200 to be charged, or receive them via the management server 600. When the control device 308 determines that it has received the position information and the SOC of the electrically driven vehicle 200 to be charged (YES in S104), the process proceeds to S106.

In S106, the control device 308 determines whether the SOC of the battery 214 mounted on the electrically driven vehicle 200 to be charged is lower than a threshold value A. The threshold value A may be, for example, a predetermined value and a value for determining whether the battery 214 needs to be charged (that is, whether the power storage capacity of the battery 214 is running out). When the control device 308 determines that the SOC is lower than the threshold value A (YES in S106), the process proceeds to S108.

In S108, the control device 308 determines whether the position of the electrically driven vehicle 200 to be charged is within the first distance from the charging stand 300. The first distance may be set such that, for example, the charging stand 300 is visually recognizable from the electrically driven vehicle 200 to be charged and the movable unit 300a can be switched to the second state by the time at which the electrically driven vehicle 200 to be charged arrives at the charging stand 300. As the first distance, for example, a predetermined value may be set, or the control device 308 may estimate an arrival time of arriving at the charging stand 300 based on, for example, a traveling state of the electrically driven vehicle 200, estimate a start time of starting the ascending control for switching the movable unit 300a to the second state by the estimated arrival time, and set, as the first distance, a distance in which the electrically driven vehicle 200 travels from the estimated start time to the estimated arrival time. When the control device 308 determines that the position of the electrically driven vehicle 200 to be charged is within the first distance from the charging stand 300 (YES in S108), the process proceeds to S110.

In S110, the control device 308 executes the ascending control. The control device 308 controls the ascending and descending device 306 such that the movable unit 300a ascends up to the level corresponding to the second state. At this time, the control device 308 sets the above flag to an OFF state.

When the control device 308 determines that it is not receiving the charging request (NO in S100), that the SOC of the battery 214 mounted on the electrically driven vehicle 200 to be charged is equal to or higher than the threshold value A (NO in S106), or that the position of the electrically driven vehicle 200 to be charged is not within the first distance from the charging stand 300 (NO in S108), this process ends. Further, when the control device 308 determines that it is not receiving the position information and the SOC (NO in S104), the process returns to S102.

Figure 6:
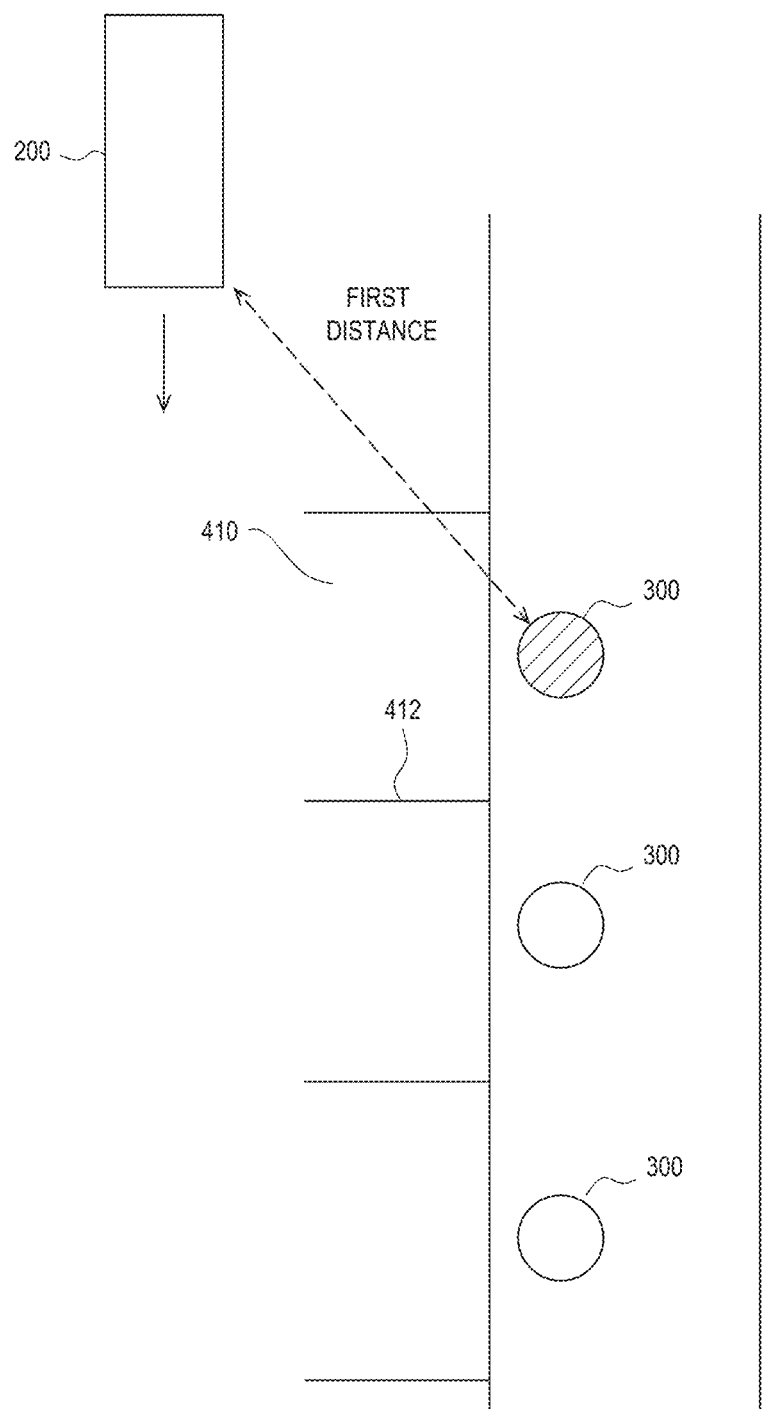
FIG. 6 is a diagram illustrating a positional relationship between the electrically driven vehicle during traveling and the charging stand to be used.

An example of the operation of the control device 308 of the charging stand 300, which is the charging facility according to the present embodiment based on the above structure and flowchart, will be described with reference to FIG. 6. FIG. 6 is a diagram illustrating a positional relationship between the electrically driven vehicle 200 during traveling and the charging stand 300 to be used. A hatched circular area of FIG. 6 represents the charging stand 300 to be used.

For example, it is assumed that a destination is set before the electrically driven vehicle 200 starts traveling and a usable charging stand 300 is specified around the destination. When the usable charging stand 300 is specified, the ECU 202 of the electrically driven vehicle 200 transmits the charging request after establishing communication with the specified charging stand 300.

Upon receiving the charging request from the electrically driven vehicle 200 to be charged (YES in S100), the control device 308 requests the position information and the SOC to the transmission source, which is the electrically driven vehicle 200 (S102). In response to the request for the position information and the SOC, the ECU 202 of the electrically driven vehicle 200 to be charged acquires the information on the position of the electrically driven vehicle 200 from the position detection device 206, acquires the SOC using the current IB, the voltage VB, and the temperature TB of the battery 214, and transmits the acquired position information and SOC to the charging stand 300 to be used.

Upon receiving the position information and the SOC from the electrically driven vehicle 200 to be charged (YES in S104), the control device 308 determines whether the received SOC is lower than the threshold value A (S106). Then, when the SOC is lower than the threshold value A (YES in S106), the control device 308 determines whether the position of the electrically driven vehicle 200 is within the first distance from the charging stand 300 to be used (S108).

When the position of the electrically driven vehicle 200 is farther than the first distance from the charging stand 300 to be used (NO in S108), the charging stand 300 to be used remains in the first state.

On the other hand, as illustrated in FIG. 6, when the electrically driven vehicle 200 approaches the charging stand 300 and the position of the electrically driven vehicle 200 is within the first distance from the charging stand 300 to be used (YES in S108), the ascending control is executed (S110). For this reason, the ascending and descending device 306 is controlled such that the movable unit 300a of the charging stand 300 to be used is switched to the second state. Therefore, the movable unit 300a is in the second state at a time point at which the electrically driven vehicle 200 arrives at the charging stand 300.

As such, according to the charging stand 300 which is the charging facility according to the present embodiment, when the SOC is lower than the threshold value A and the position of the electrically driven vehicle 200 to be charged is within the first distance from the charging stand 300, the ascending and descending device 306 is controlled such that the movable unit 300a of the charging stand 300 ascends. The first distance is set such that the charging stand 300 is visually recognizable from the electrically driven vehicle 200 to be charged and the movable unit 300a of the charging stand 300 can be switched to the second state by the time at which the electrically driven vehicle 200 to be charged arrives at the charging stand 300. For this reason, it is possible for the user to easily find the charging stand 300 to be used and start charging earlier than when the movable unit 300a is ascended after the electrically driven vehicle 200 reaches the charging stand 300 to be used. Therefore, it is possible to provide a charging facility to be used that can be easily found and quickly used.

Hereinafter, modified examples will be described. In the above-described embodiment, the power source 350 has been described as an alternating current power source, but the power source 350 may be a direct current power source. In this case, the electrically driven vehicle 200 may have, for example, a configuration in which the charger 212 is omitted.

Further, in the above-described embodiment, the example has been described in which the housing of the charging stand 300 has the cylindrical shape, but it may have any shape that can execute the ascending/descending operations and is not particularly limited to a cylindrical shape. For example, the housing of the charging stand 300 may have a rectangular shape.

Further, in the above-described embodiment, the example has been described in which the control device 308 of the charging stand 300 executes the ascending control when the SOC is lower than the threshold value A and the position of the vehicle is within the first distance. However, a lighting device may be provided at the upper end of the movable unit 300a or at an outer circumference of the movable unit 300a so as to be turned on at the same time as the execution of the ascending control, or a speaker or the like may be provided so as to generate a predetermined sound, voice, or the like at the same time as the execution of the ascending control.

As such, it is possible for the user to more easily find the charging stand 300 to be used.

Further, in the above-described embodiment, the example has been described in which the position information of the electrically driven vehicle 200 to be charged or the SOC of the battery 214 is received from the electrically driven vehicle 200 or the management server 600. However, the control device 308 of the charging stand 300 may receive the position information of the electrically driven vehicle 200 to be charged or the SOC of the battery 214 from, for example, the mobile terminal owned by the user. The mobile terminal may transmit the position information and the SOC acquired from, for example, the electrically driven vehicle 200 to the charging stand 300 or the management server 600.

Further, in the above-described embodiment, the example has been described in which the first distance is set such that the charging stand 300 is visually recognizable from the target vehicle and the movable unit 300a can be switched to the second state by the time at which the target vehicle arrives at the charging facility. However, the first distance may be, for example, a predetermined value, and an ascending speed of the movable unit 300a may be changed depending on the traveling state of the target vehicle (for example, depending on a traveling speed of the target vehicle) such that the movable unit 300a is in the second state at a time point at which the target vehicle arrives at the charging facility.

Further, in the above-described embodiment, the example has been described in which, in the control device 308 of the charging stand 300, the ascending control is executed when the SOC is lower than the threshold value A and the position of the vehicle is within the first distance from the charging stand 300. However, for example, the ascending control may be executed when the SOC is equal to or higher than the threshold value A and the position of the vehicle is within a second distance, which is shorter than the first distance, from the charging stand 300.

Figure 7:
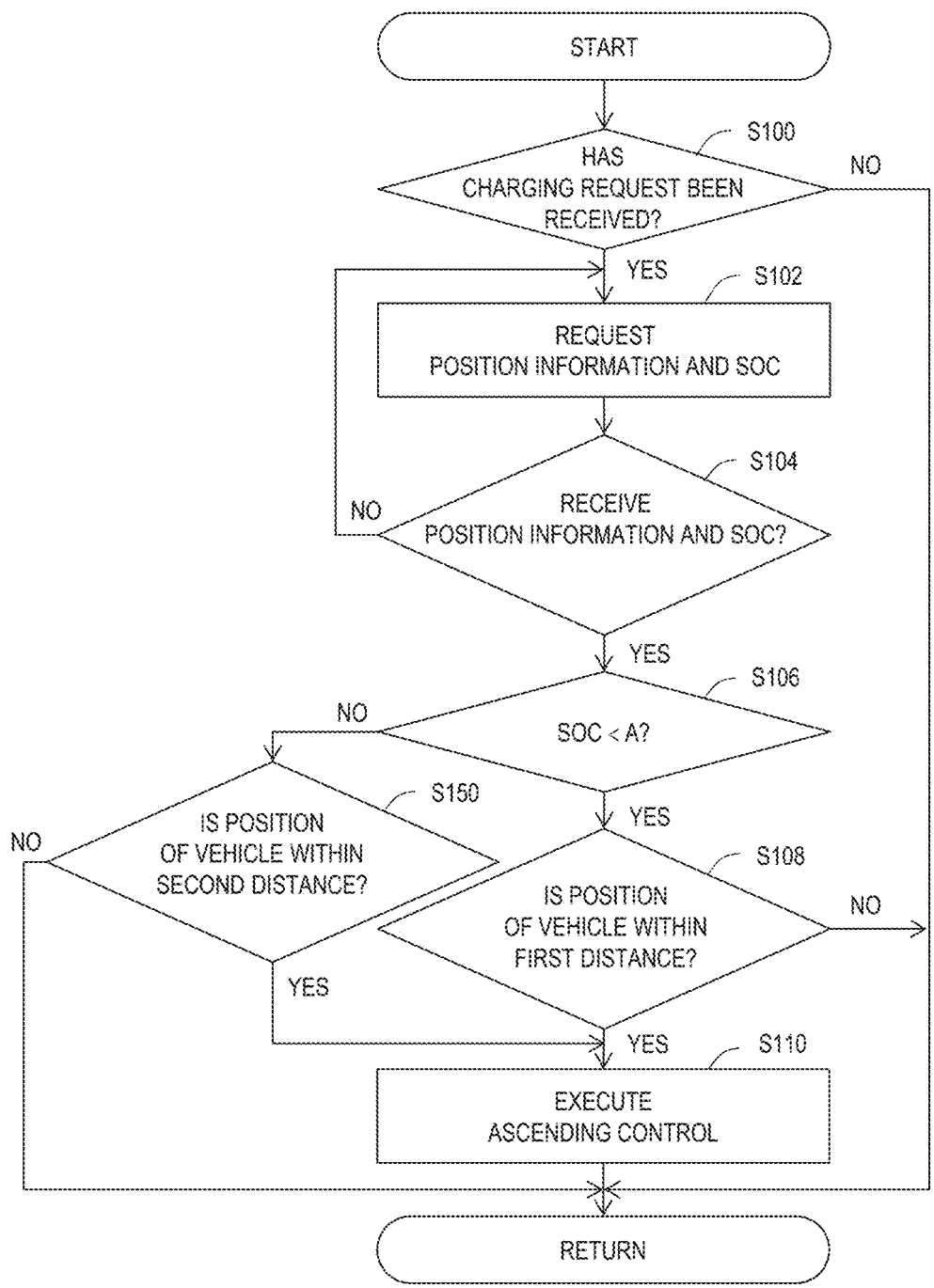
FIG. 7 is a flowchart illustrating an example of processing executed by the control device of the charging stand in a modified example.

Hereinafter, in a modified example, an example of the control processing executed by the control device 308 of the charging stand 300 will be described with reference to FIG. 7. FIG. 7 is a flowchart illustrating an example of processing executed by the control device 308 of the charging stand 300 in the modified example. A series of processes illustrated in this flowchart are repeatedly executed at predetermined control cycles.

The processes of S100, S102, S104, S106, S108, and S110 of the flowchart of FIG. 7 are the same as those of S100, S102, S104, S106, S108, and S110 of the flowchart of FIG. 5, respectively, except cases described below. For this reason, detailed description thereof will not be repeated.

In S106, when the control device 308 determines that the SOC of the battery 214 is equal to or higher than the threshold value A (NO in S106), the process proceeds to S150.

In S150, the control device 308 determines whether the position of the electrically driven vehicle 200 to be charged is within the second distance from the charging stand 300. The second distance is shorter than the first distance. The second distance may be a distance shorter than the first distance, and may be, for example, a predetermined distance or a distance obtained by subtracting a predetermined distance from the first distance. When the control device 308 determines that the position of the electrically driven vehicle 200 to be charged is within the second distance from the charging stand 300 (YES in S150), the process proceeds to S110. When the control device 308 determines that the position of the electrically driven vehicle 200 to be charged is not within the second distance from the charging stand 300 (NO in S150), this process ends.

As such, when the SOC is equal to or higher than the threshold value A (NO in S106) and the position of the vehicle is within the second distance from the charging stand 300 (YES in S150), the ascending control is executed (S110). As a result, the ascending and descending device 306 is controlled such that the movable unit 300a of the charging stand 300 to be used is switched to the second state.

Therefore, it is possible for the user to easily find the charging stand 300 to be used while restricting a period in which the movable unit 300a is in the second state from becoming unnecessarily long, and start charging earlier than when the movable unit 300a is ascended after the electrically driven vehicle 200 reaches the charging stand 300 to be used.

Further, in the above-described embodiment, the example has been described in which the control device 308 of the charging stand 300 determines whether the SOC is lower than the threshold value A and the position of the vehicle is within the first distance from the charging stand 300 to be used. However, instead of the control device 308, the management server 600 may make these determinations.

Figure 8:
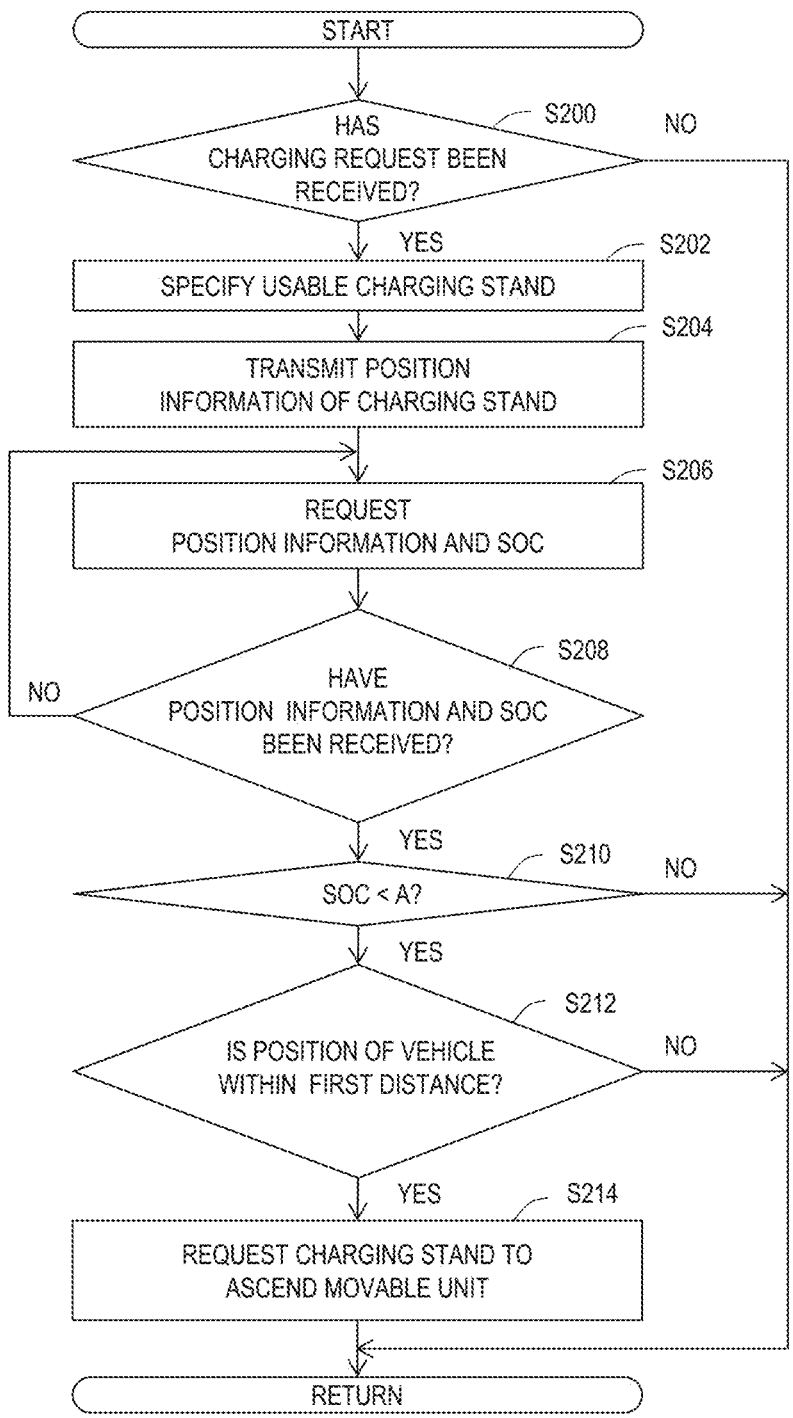
FIG. 8 is a flowchart illustrating an example of processing executed by a management server in the modified example.

Hereinafter, in the modified example, an example of control processing executed by the management server 600 will be described with reference to FIG. 8. FIG. 8 is a flowchart illustrating an example of processing executed by the management server 600 in the modified example. A series of processes illustrated in this flowchart are repeatedly executed at predetermined control cycles.

In S200, the management server 600 determines whether it has received the charging request. The management server 600 determines whether it has received the charging request based on, for example, the flag set to the ON state when the charging request is received. The management server 600 determines that it has received the charging request when, for example, the flag is in the ON state. The charging request indicates a request for charging from the electrically driven vehicle 200.

When the user sets the destination, the ECU 202 of the electrically driven vehicle 200 transmits the charging request to the management server 600 together with the position information of the destination. Alternatively, when the user executes a predetermined operation of requesting charging, the ECU 202 transmits the charging request to the management server 600 together with the position information of the electrically driven vehicle 200.

When the control device 308 determines that it has received the charging request (YES in S200), the process proceeds to S202.

In S202, the management server 600 specifies a usable charging stand. The management server 600 searches for a usable charging stand 300 within a predetermined range centered on, for example, the destination or the electrically driven vehicle 200. For example, the management server 600 specifies, from the search result, a usable charging stand 300 closest to the center.

In S204, the management server 600 transmits the position information of the specified charging stand 300 to the electrically driven vehicle 200. The ECU 202 of the electrically driven vehicle 200 may set the destination in a navigation system to the specified charging stand 300 using, for example, the position information of the specified charging stand 300. The position information of the specified charging stand 300 may be stored in the storage device of the management server 600 in advance or acquired from the specified charging stand 300.

In S206, the management server 600 requests the position information and the SOC of the electrically driven vehicle 200 to be charged. The management server 600 transmits the request information for requesting the position information and the SOC to, for example, the electrically driven vehicle 200, which is the transmission source of the charging request.

Upon receiving the request information from the management server 600, the ECU 202 of the electrically driven vehicle 200 acquires the position information of the electrically driven vehicle 200 using the position detection device 206 and acquires the SOC using the current IB, the voltage VB, and the temperature TB of the battery 214. The ECU 202 transmits the acquired position information and SOC to the management server 600.

In S208, the management server 600 determines whether it has received the position information and the SOC of the electrically driven vehicle 200 to be charged. When the management server 600 determines that it has received the position information and the SOC of the electrically driven vehicle 200 to be charged (YES in S208), the process proceeds to S210.

In S210, the management server 600 determines whether the SOC of the battery 214 mounted on the electrically driven vehicle 200 to be charged is lower than the threshold value A. Since the threshold value A has been described above, the detailed description thereof will not be repeated. When the management server 600 determines that the SOC is lower than the threshold value A (YES in S210), the process proceeds to S212.

In S212, the management server 600 determines whether the position of the electrically driven vehicle 200 to be charged is within the first distance from the charging stand 300. Since the first distance has been described above, the detailed description thereof will not be repeated. When the management server 600 determines that the position of the electrically driven vehicle 200 to be charged is within the first distance from the charging stand 300 (YES in S212), the process proceeds to S214.

In S214, the management server 600 requests the charging stand 300 to ascend the movable unit 300a. The management server 600 transmits the information indicating the ascending request to the charging stand 300. In response to the ascending request from the management server 600, the charging stand 300 executes the ascending control. At this time, the control device 308 controls the ascending and descending device 306 such that the movable unit 300a ascends up to the level corresponding to the second state. At this time, the management server 600 sets the above-described flag to the OFF state.

When the management server 600 determines that it is not receiving the charging request (NO in S200), that the SOC of the battery 214 mounted on the electrically driven vehicle 200 to be charged is equal to or higher than the threshold value A (NO in S210), or that the position of the electrically driven vehicle 200 to be charged is not within the first distance from the charging stand 300 (NO in S212), this process ends. Further, when the management server 600 determines that it is not receiving the position information or the SOC (NO in S208), the process returns to S206.

An example of the operation of the management server 600, which is the management device of the charging stand 300 in the modified example, will be described based on the above flowcharts.

For example, it is assumed that the destination is set before the electrically driven vehicle 200 starts traveling, and the charging request is transmitted to the management server 600 together with the position information of the destination.

When the management server 600 receives the charging request from the electrically driven vehicle 200 to be charged (YES in S200), a usable charging stand 300 around the destination is specified (S202), the position information of the specified charging stand is transmitted to the electrically driven vehicle 200 (S204), and the position information and the SOC are requested (S206).

In response to the request for the position information and the SOC, the ECU 202 of the electrically driven vehicle 200 to be charged acquires the information on the position of the electrically driven vehicle 200 from the position detection device 206, acquires the SOC using the current IB, the voltage VB, and the temperature TB of the battery 214, and transmits the acquired position information and SOC to the management server 600.

Upon receiving the position information and the SOC from the electrically driven vehicle 200 to be charged (YES in S208), the management server 600 determines whether the received SOC is lower than the threshold value A (S210). Then, when the SOC is lower than the threshold value A (YES in S210), the management server 600 determines whether the position of the electrically driven vehicle 200 to be charged is within the first distance from the charging stand 300 (S212).

When the position of the electrically driven vehicle 200 to be charged is farther than the first distance from the charging stand 300 to be used (NO in S212), the charging stand 300 to be used remains in the first state.

On the other hand, when the electrically driven vehicle 200 approaches the charging stand 300 and the position of the electrically driven vehicle 200 is within the first distance from the charging stand 300 to be used (YES in S212), the management server 600 requests the charging stand 300 to ascend the movable unit 300*a* (S214). For this reason, the ascending and descending device 306 is controlled such that the movable unit 300*a* of the charging stand 300 is switched to the second state.

As such, it is possible for the user to easily find the charging stand 300 to be used and start charging earlier than when the movable unit 300*a* is ascended after the electrically driven vehicle 200 reaches the charging stand 300 to be used. Therefore, it is possible to provide the management device of the charging facility that makes it possible to easily find and quickly use the charging facility to be used.

Further, in the above-described modified example, the example has been described in which, when the SOC is lower than the threshold value A and the position of the vehicle is within the first distance from the charging stand 300, the management server 600 requests the charging stand 300 to ascend the movable unit 300*a*. However, for example, when the SOC is equal to or higher than the threshold value A and the position of the vehicle is within the second distance, which is shorter than the first distance, from the charging stand 300, the management server 600 may request the charging stand 300 to ascend the movable unit 300*a*.

Figure 9:
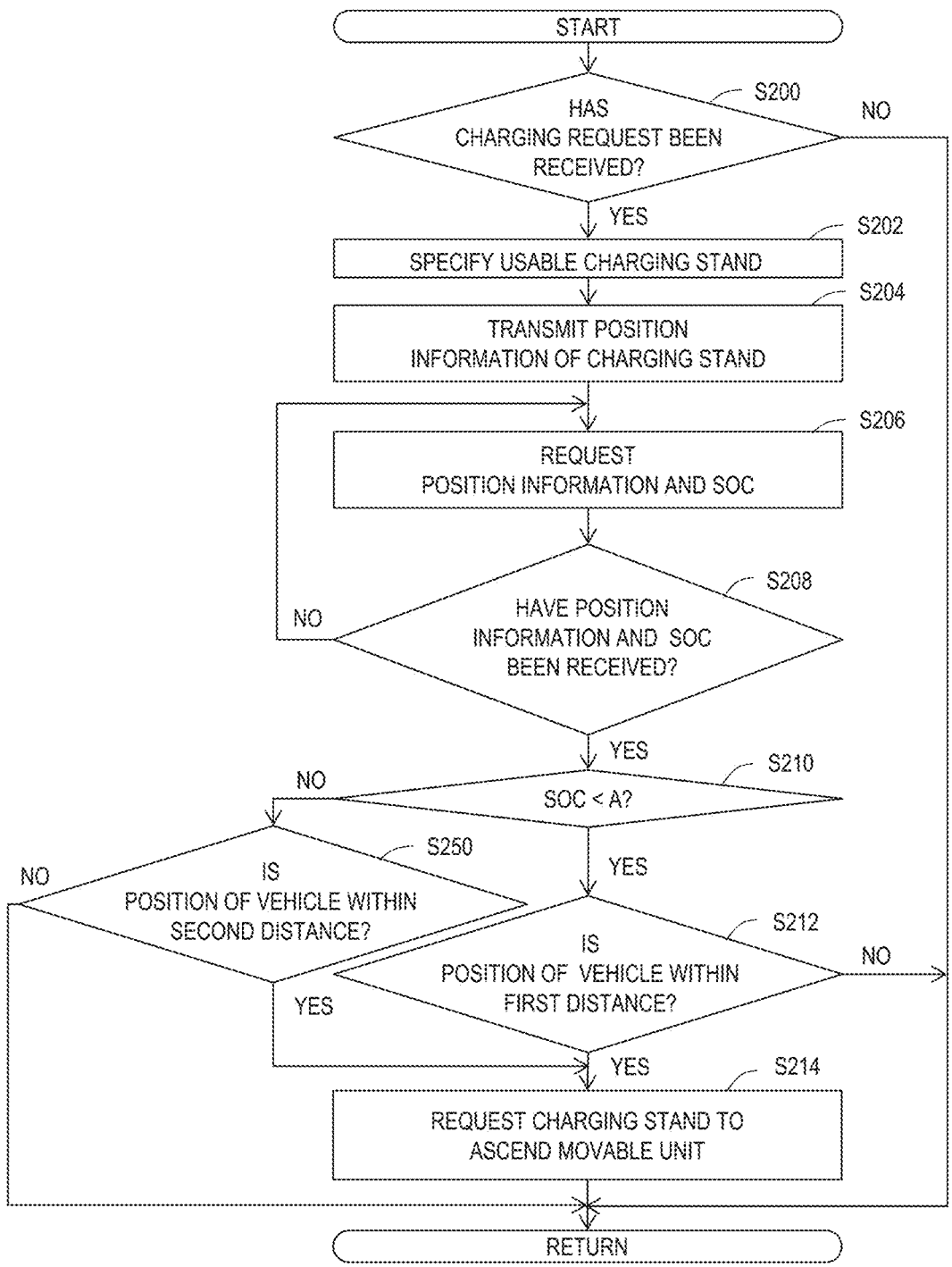
FIG. 9 is a flowchart illustrating another example of the processing executed by the management server in the modified example.

Hereinafter, in the modified example, another example of the control processing executed by the management server 600 will be described with reference to FIG. 9. FIG. 9 is a flowchart illustrating another example of the processing executed by the management server 600 in the modified example. A series of processes illustrated in this flowchart are repeatedly executed at predetermined control cycles.

The processes of S200, S202, S204, S206, S208, S210, S212, and S214 of the flowchart of FIG. 9 are the same as those of S200, S202, S204, S206, S208, S210, S212, and S214 of the flowchart of FIG. 8, respectively, except for cases described below. For this reason, detailed description thereof will not be repeated.

In S210, when the management server 600 determines that the SOC of the battery 214 is equal to or higher than the threshold value A (NO in S210), the process proceeds to S250.

In S250, the management server 600 determines whether the position of the electrically driven vehicle 200 to be charged is within the second distance from the charging stand 300. Since the second distance has been described above, the detailed description thereof will not be repeated. When the management server 600 determines that the position of the electrically driven vehicle 200 to be charged is within the second distance from the charging stand 300 (YES in S250), the process proceeds to S214. When the management server 600 determines that the position of the electrically driven vehicle 200 to be charged is not within the second distance from the charging stand 300 (NO in S250), this process ends.

As such, when the SOC is equal to or higher than the threshold value A (NO in S210) and the position of the vehicle is within the second distance from the charging stand 300 (YES in S250), the management server 600 requests the charging stand 300 to ascend the movable unit 300*a* (S214). As a result, the ascending and descending device 306 is controlled such that the movable unit 300*a* of the charging stand 300 to be used is switched to the second state.

Therefore, it is possible for the user to easily find the charging stand 300 to be used while restricting a period in which the movable unit 300*a* is in the second state from becoming unnecessarily long, and start charging earlier than when the movable unit 300*a* is ascended after the electrically driven vehicle 200 reaches the charging stand 300 to be used.

A part or the whole of the above-described modified example may be appropriately combined and executed. The embodiments disclosed in the present disclosure should be considered as illustrative in all points, and not be considered as limited. The scope of the present disclosure is defined by the claims, not by the above description, and is intended to include meanings equivalent to the claims and all modifications within the scope thereof.

What is claimed is:

1. A charging facility installed on a bottom surface of a recess portion provided in ground and configured to charge a power storage device mounted on a vehicle, the charging facility comprising:
    a movable unit including a connection device configured to be connected to the power storage device;
    an ascending and descending device configured to cause the movable unit to ascend and descend between a first state where the movable unit is housed under the ground and a second state where the movable unit is exposed above the ground and the power storage device is connectable to the connection device; and
    a control device including a communication device that is configured to communicate with a device external to the charging facility, the control device being configured to:

control the ascending and descending device using information received via the communication device;
acquire a position of a target vehicle to be charged and a remaining capacity of the power storage device using the communication device; and
control, when the remaining capacity is lower than a threshold value and the acquired position is within a first distance from the charging facility, the ascending and descending device such that the movable unit ascends, wherein
the control device is configured to, when the remaining capacity is higher than the threshold value and the acquired position is within a second distance from the charging facility, control the ascending and descending device such that the movable unit ascends, the second distance being shorter than the first distance.

2. The charging facility according to claim 1, wherein
the first distance is a distance at which the charging facility is visually recognizable from the target vehicle and the movable unit is switchable to the second state by a time at which the target vehicle arrives at the charging facility.

3. A management device that manages operations of a plurality of charging facilities installed on a bottom surface of a recess portion provided in ground and configured to charge a power storage device mounted on a vehicle, each of the plurality of charging facilities including a movable unit, an ascending and descending device, and a control device that includes a communication device that is configured to communicate with the management device,
the movable unit including a connection device configured to be connected to the power storage device,
the ascending and descending device being configured to cause the movable unit to ascend and descend between a first state where the movable unit is housed under the ground and a second state where the movable unit is exposed above the ground and the power storage device is connectable to the connection device, and
the control device being configured to control the ascending and descending device using information received via the communication device,
the management device comprising:
a processor configured to:
acquire a position of a target vehicle to be charged by any one target charging facility of the plurality of charging facilities and a remaining capacity of the power storage device mounted on the target vehicle; and
request, when the remaining capacity of the target vehicle is lower than a threshold value and the position of the target vehicle is within a first distance from the target charging facility, the target charging facility to ascend a movable unit, wherein
the processor is configured to, when the remaining capacity is higher than the threshold value and the acquired position is within a second distance from the target charging facility, request the target charging facility to ascend the movable unit, the second distance being shorter than the first distance.

4. The management device according to claim 3, wherein
the first distance is a distance at which the target charging facility is visually recognizable from the target vehicle and the movable unit is switchable to the second state by a time at which the target vehicle arrives at the target charging facility.

* * * * *